United States Patent [19]

Hiraiwa et al.

[11] 4,159,628

[45] Jul. 3, 1979

[54] TORQUE CONVERTER WITH AN IMPROVED HOUSING CONSTRUCTION

[75] Inventors: Kazuyoshi Hiraiwa, Ome; Kotei Takahashi, Tokyo, both of Japan

[73] Assignee: Nissan Motor Company, Limited, Yokohama, Japan

[21] Appl. No.: 815,942

[22] Filed: Jul. 14, 1977

[30] Foreign Application Priority Data

Jul. 14, 1976 [JP] Japan ............................. 51-92729[U]

[51] Int. Cl.² ...................... F16D 33/00; F16L 23/00
[52] U.S. Cl. .................................... 60/364; 192/3.33; 285/412
[58] Field of Search .................. 60/364, 458; 285/412; 192/3.29, 3.3, 3.33

[56] References Cited

U.S. PATENT DOCUMENTS

| | | | |
|---|---|---|---|
| 2,793,726 | 5/1957 | Janasek | 192/3.29 |
| 3,764,170 | 10/1973 | Brown | 285/412 |

FOREIGN PATENT DOCUMENTS

| | | | |
|---|---|---|---|
| 967949 | 8/1964 | United Kingdom | 192/3.33 |
| 1061353 | 3/1967 | United Kingdom | 60/364 |

Primary Examiner—Benjamin W. Wyche

[57] ABSTRACT

A first ring member coaxially and firmly mounted on a circular open end of a first housing equipped with an impeller. A second ring member is coaxially mounted on a small diameter cylindrical section formed in a circular open end of a second housing which is firmly connected to an engine driven shaft, the circular open end of the second housing being further formed at the leading end portion thereof with a large diameter cylindrical section which is snugly disposed in the circular open end. An O-ring is sealingly disposed between the large diameter cylindrical section and the circular open end of the first housing. Fastening bolts are passed through aligned holes formed in the first and second ring members to combine the first and second housings.

6 Claims, 1 Drawing Figure

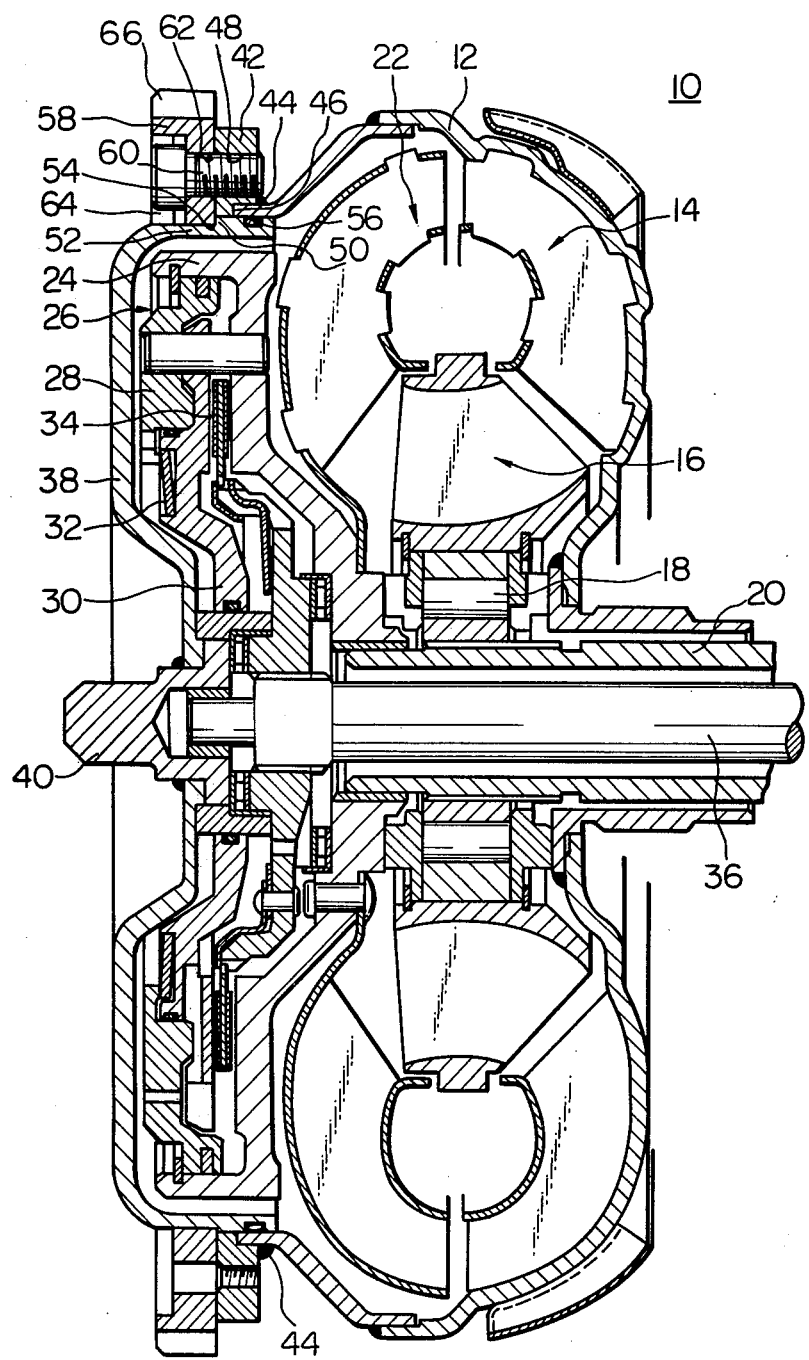

4,159,628

TORQUE CONVERTER WITH AN IMPROVED HOUSING CONSTRUCTION

FIELD OF THE INVENTION

The present invention relates in general to a torque converter equipped in an automatic transmission or a semi-automatic transmission of a motor vehicle, and more particularly to a housing construction of a torque converter of the above-mentioned type.

BACKGROUND OF THE INVENTION

Usually, the torque converter of a type containing therein a wet clutch is equipped with a so-called segmented housing generally including a first housing section or cover which is readily removable from a second housing section or impeller shell when inspection, repair and/or exchange of the converter parts contained in the housing is required.

One of the segmented housings employed in the conventional torque converters generally comprises a first housing section or cover, a second housing section or impeller shell, two axially aligned flanges respectively fixed to respective open ends of the first and second housing sections via welding, an O-ring disposed between the two flanges, and suitable numbers of screws passing through aligned holes formed in the flanges for connection of the first and second housing sections.

However, in this conventional construction, the welding applied to connect each flange with the corresponding housing section must be done so as to achieve a complete seal, thereby requiring a use of highly advanced but costly welding technique in construction of the housing. Furthermore, because of the O-ring located between the two axially aligned flanges, the axial length of the housing is inevitably increased thus making the mounting of the torque converter assembly in a vehicle body considerably troublesome.

SUMMARY OF THE INVENTION

Therefore, an object of the present invention is to eliminate the above-mentioned several drawbacks encountered in the conventional torque converter.

Another object of the present invention is to provide a torque converter having first and second housings which are respectively formed with first and second opening ends connectable with each other to form an enclosed chamber between the first and second housings, the first housing being provided at the inner surface thereof with a plurality of blades forming an impeller, and the second housing being firmly connected to an engine driven shaft for the rotation therewith, the torque converter comprising: a first annular portion forming the first open end of the first housing; a second annular portion forming the second open end of the second housing and including a large diameter cylindrical section snugly disposed in the first annular portion, and a small diameter cylindrical section the diameter of which is smaller than that of the first cylindrical section thereby forming a step between the first and second cylindrical sections; a first ring member firmly and coaxially mounted on the first annular portion; a second ring member coaxially mounted on the second cylindrical section; a sealing member disposed between the first annular portion and the first cylindrical section; and means for detachably connecting the first and second ring members with each other.

DESCRIPTION OF THE PREFERRED EMBODIMENT

Other objects and advantages of the present invention will become more clear from the following detailed description when taken in conjunction with the accompanying single drawing which shows a cross-sectional view of a torque converter assembly according to the subject invention.

The torque converter assembly is generally designated by a reference numeral 10 and comprises a rear housing 12 provided at its inner surface with a plurality of blades forming an engine driven pump or impeller 14. A stator 16 consisting of a plurality of blades is connected to a transmission case (not shown) through a one-way clutch 18 mounted on the extension forward from the rear housing 12, called a stator shaft 20. Facing the impeller 14 via the stator 16 is a turbine 22 which also consists of a plurality of blades and is connected to a back portion of a cylinder 24 of a wet type clutch 26. The clutch 26 has in the cylinder 24 an outer piston 28, an inner piston 30, a diaphragm spring 32 of disc form disposed between the outer and inner pistons 28 and 30 for biasing the pistons 28 and 30 to be separated from each other, and a clutch disc 34 located between the cylinder 24 and the inner piston 30 and splined to a transmission input shaft 36. Indicated by numeral 38 is a front housing or cover which is firmly connected at its center portion to an input shaft 40 which is adapted to connect with an engine output shaft (not shown) for rotation therewith. The arrangement of the above-mentioned parts is quite conventional, so that the detailed explanation of them will be omitted.

Now, in the type of the torque converter assembly 10 mentioned above, it is necessary to combine the front and rear housings 38 and 12 to form a united housing construction for forming a sealed fluid chamber therein.

According to the present invention, the following considerations or measures are needed for combining the housings 38 and 12. A first ring member 42 is disposed via welding 44 on the leftwardly extending end portion of the rear housing 12. As well shown in the drawing, the extending end of the portion is snugly fitted in a counter bore 46 formed in the first ring member 42. Preferably, the inner diameter of the extending end portion of the rear housing 12 is determined to be the same as that of first ring member 42 for the reason which will be clear hereinafter. Suitable numbers of enteriorly threaded bolt holes 48 are formed in the first ring member 42.

As shown, the front housing 38 is formed at its rightwardly extending end with a large diameter cylindrical portion 50 which has an outer diameter generally the same as but slightly smaller than the inner diameter of the first ring member 42. A step 54 is formed to define a small diameter cylindrical portion 52 adjacent the large diameter cylindrical portion 50 on the front housing 38, as shown. An annular groove (no numeral) is formed around the large diameter cylindrical portion 50 to receive therein an O-ring 56.

In addition to the above-mentioned parts, a second ring member 58 and suitable numbers of fastening bolts 60 are needed in this invention. The second ring member 58 is formed to have an inner diameter which is generally the same as but slightly larger than the outer diameter of the small diameter cylindrical portion 52 of the front housing 38. Corresponding numbers of holes 62 with respective counter sections 64 are formed in the ring member 58, the counter section being for receiving a head of each fastening screw 52. On the peripheral cylindrical surface of the second ring member 58 are formed with a number of teeth 66 which are engageable with a gear (not shown) of an engine starter (not shown).

With the above, the connection of the front and rear housings 38 and 12 is such that after the large diameter cylindrical portion 50 of the front housing 38 is temporarily set in the first ring member 42 and the second ring member 58 is temporarily seated on the small diameter cylindrical portion of the front housing 38 so as to align the holes 62 thereof with the holes 48 of the first ring member 42, the fastening secrews 60 are inserted into the aligned holes while being screwed to meshingly engage with the threaded holes 48. Upon this, firm connection of the front and rear housing 38 and 12 is accomplished because of the provision of the step 54 engaging with a shoulder portion of the second ring member 58 to stop the excess axially leftward movement of the front housing 38. Now, it should be noted that the leftwardly extending end portion of the rear housing 12 is located to cover the O-ring 56 on the larger diameter cylindrical portion of the front housing 12 when the tight connection of the ring members 42 and 58 is completed.

By the above-stated construction of the torque converter of the subject invention, the following several merits and advantages are obtained.

(1) The welding 44 applied to a section between the first ring member 42 and the extending end of the rear housing 12 can be made without requiring seal function thereof because the seal can be achieved by the O-ring 56 per se. Thus, it is not necessary to use the costly high welding technique satisfying seal function to the subject converter 10. Furthermore, because of reliability of the O-ring 56 with respect to the sealing function, it will be unnecessary to test the sealing function of the assembled subject torque converter.

(2) Because of the locking engagement of the second ring member 58 with the step against the leftward movement of the front housing due to oil pressure exerted in the converter, it is not necessary to unitedly connect the second ring member 58 with the front housing 38 by means of welding or the like. Of course, the connection between these members 58 and 38 becomes more reliable when the welding, even under low finish, is applied.

(3) Since the second ring member 58 is constructed to act as an engine starter driven gear, the converter assembly of the subject invention can be compactly made. In fact, in the conventional torque converter, a so-called drive plate having such gear at its peripheral edge is arranged in front of the front housing.

From the above, it will be appreciated that according to the present invention, the assembling work of the front and rear housing is remarkably simplified thereby increasing the manufacturing productivity of the converter, and the converter of the subject invention can be made compact.

What is claimed is:

1. A torque converter having first and second housings which are respectively formed with first and second open ends connectable with each other to form therein an enclosed chamber, said first housing being provided at the inner surface thereof with a plurality of blades forming an impeller and said second housing being firmly connected to an engine driven shaft to be rotatable therewith, said torque converter comprising:
    a first annular portion forming said first open end of said first housing;
    a second annular portion forming said second open end of said second housing and including a first cylindrical section snugly disposed in said first annular portion, and a second cylindrical section the diameter of which is smaller than that of said first cylindrical section thereby forming a step portion between said first and second cylindrical sections;
    a first ring member firmly and coaxially mounted on said first annular portion;
    a second ring member coaxially but snugly mounted on said second cylindrical section and formed at the outer cylindrical surface thereof with a plurality of external teeth which are adapted to be meshingly engaged with an engine starter gear, the inner diameter of said second ring member being smaller than the outer diameter of said first cylindrical section;
    a sealing member disposed between said first annular portion and said first cylindrical section; and
    means for detachably connecting said second ring member to said first ring member in such a manner that said second ring member abuts upon the step portion.

2. A torque converter as claimed in claim 1, in which said first ring member is connected to said first annular portion via welding.

3. A torque converter as claimed in claim 1, in which the leading end of said first annular portion is snugly fitted in a counter bore formed in said first ring member.

4. A torque converter as claimed in claim 1, in which said sealing member is an O-ring received in a groove formed around said first cylindrical section.

5. A torque converter as claimed in claim 1, in which said means comprises a plurality of fastening screws passing through aligned holes formed in said first and second ring members and held by said first ring member.

6. A torque converter having first and second housings which are respectively formed with first and second open ends connectable with each other to form therein an enclosed chamber, said first housing being provided at the inner surface thereof with a plurality of blades forming an impeller and said second housing being firmly connected to an engine driven shaft to be rotatable therewith, said torque converter comprising:
    a first annular portion forming said first open end of said first housing;
    a second annular portion forming said second open end of said second housing and including a first cylindrical section snugly disposed in said first annular portion, and a second cylindrical section the diameter of which is smaller than that of said first cylindrical section thereby leaving therebetween a step portion;
    an O-ring sealingly disposed between an inside surface of said first annular portion and an outside portion of said first cylindrical section, said O-ring being received in an annular groove formed around said first cylindrical section;
    a first ring member firmly and coaxially mounted on said first annular portion, said first ring member being formed with a counter bore into which a leading end of said first annular portion is snugly received and formed at its axial one end with a flat surface which is flush with said step portion;

a second ring member coaxially mounted on said second cylindrical section and formed at the outer cylindrical surface with a plurality of external teeth which are adapted to be meshingly engaged with an engine starter, the inner diameter of said second ring member being smaller than the outer diameter of said first cylindrical section, said second ring member being formed at its axial one end with a flat surface which abuts upon both said flat surface of said first ring member and said step portion; and a plurality of fastening screw bolts which pass through aligned holes formed in said first and second ring members and held by said first ring member.

* * * * *